(12) United States Patent
Schilder et al.

(10) Patent No.: US 10,491,401 B2
(45) Date of Patent: Nov. 26, 2019

(54) VERIFICATION OF CODE SIGNATURE WITH FLEXIBLE CONSTRAINTS

(71) Applicant: GOOGLE INC., Mountain View, CA (US)

(72) Inventors: Marius Schilder, Mountain View, CA (US); Timothy Chen, Mountain View, CA (US); Scott Johnson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 15/438,065

(22) Filed: Feb. 21, 2017

(65) Prior Publication Data

US 2018/0241568 A1    Aug. 23, 2018

(51) Int. Cl.
*H04L 9/32* (2006.01)
*G06F 21/57* (2013.01)
*G06F 21/73* (2013.01)

(52) U.S. Cl.
CPC ............ *H04L 9/3247* (2013.01); *G06F 21/57* (2013.01); *G06F 21/73* (2013.01); *H04L 9/3242* (2013.01)

(58) Field of Classification Search
CPC ..... H04L 9/3247; H04L 9/3242; G06F 21/57; G06F 21/73
See application file for complete search history.

(56) References Cited

U.S. PATENT DOCUMENTS

| | | |
|---|---|---|
| 2004/0039914 A1 | 2/2004 | Barr et al. |
| 2004/0177354 A1 | 9/2004 | Gunyakti et al. |
| 2005/0005098 A1 | 1/2005 | Michaelis et al. |
| 2005/0009599 A1 | 1/2005 | Ryan |
| 2007/0005992 A1 | 1/2007 | Schluessler et al. |

(Continued)

FOREIGN PATENT DOCUMENTS

| | | |
|---|---|---|
| EP | 1455258 | 9/2004 |
| EP | 1496419 | 1/2005 |

(Continued)

OTHER PUBLICATIONS

Bos, Joppe W. et al. "Montgomery multiplication using vector instructions." International Conference on Selected Areas in Cryptography, pp. 471-489. Springer Berlin Heidelberg, 2013.

(Continued)

*Primary Examiner* — Paul E Callahan
(74) *Attorney, Agent, or Firm* — Colby Nipper PLLC

(57) ABSTRACT

Systems, apparatuses, and methods for signing, and verifying the signature of, code to be executed by a target device. An example method of determining a verification hash of a code image to be executed by a target device comprises receiving a header and code image, determining an image hash based on metadata and the code image, determining a fuses hash based on values of hardware fuses of the target device, determining an information hash based on information stored in memory, determining a verification hash based on the image hash, the fuses hash, and the information hash, verifying the verification hash against a code signature in the header, obtaining an unlock constant based on the verification hash, comparing the unlock constant with a stored predetermined value to unlock a memory region of the target device, and executing the code in the code image on the target device.

19 Claims, 11 Drawing Sheets

(56) References Cited

U.S. PATENT DOCUMENTS

| | | |
|---|---|---|
| 2009/0063865 A1 | 3/2009 | Berenbaum et al. |
| 2009/0217373 A1 | 8/2009 | Stillerman et al. |
| 2009/0259855 A1 | 10/2009 | De Cesare et al. |
| 2009/0276617 A1 | 11/2009 | Grell et al. |
| 2010/0031012 A1 | 2/2010 | Rotondo et al. |
| 2011/0123024 A1 | 5/2011 | Morrow et al. |
| 2011/0231668 A1 | 9/2011 | Schluessler et al. |
| 2012/0166781 A1 | 6/2012 | De Cesare et al. |
| 2012/0311314 A1 | 12/2012 | Cumming et al. |
| 2014/0181498 A1 | 6/2014 | Rhee et al. |
| 2014/0205092 A1 | 7/2014 | Hartley et al. |
| 2014/0250291 A1 | 9/2014 | Adams et al. |
| 2015/0019872 A1 | 1/2015 | Asokan et al. |
| 2018/0167199 A1* | 6/2018 | Kaul ............... G06F 12/14 |

FOREIGN PATENT DOCUMENTS

| | | |
|---|---|---|
| EP | 2746982 | 6/2014 |
| FR | 2985128 | 6/2013 |
| TW | I363296 | 5/2012 |
| WO | 0025204 | 5/2000 |
| WO | 2006054128 | 5/2006 |
| WO | 2018156208 | 8/2018 |

OTHER PUBLICATIONS

Montgomery, Peter L. "Modular multiplication without trial division." Mathematics of Computation 44, No. 170 (1985): 519-521.

"International Search Report and Written Opinion", PCT Application No. PCT/US2017/057636, dated Dec. 5, 2017, 14 pages.

"Foreign Office Action", Taiwanese Application No. 106134144, dated Jan. 8, 2019, 6 pages.

"Written Opinion", PCT Application No. PCT/US2017/057636, dated Jun. 6, 2018, 6 pages.

"Foreign Office Action", Taiwanese Application No. 106134144, dated Sep. 17, 2018, 4 pages.

"Foreign Office Action", Taiwanese Application No. 106134144, dated Apr. 30, 2019, 3 pages.

"International Preliminary Report on Patentability", PCT Application No. PCT/US2017/057636, dated May 24, 2019, 18 pages.

* cited by examiner

Header 200
```
201 -----    signature[sig length];
203 -----    img chk;          // top 32 bit of expected img hash // ------------------- everything below is part of img hash
205 -----    tag[7];           // words 0-6 of RWR/FWR
207 -----    keyid;            // word 7 of RWR
209 -----    key[key length];  // public key to verify signature with image size;
213 -----    ro base;          // read only region
215 -----    ro max;
217 -----    rx base;          // executable region
219 -----    rx max;
221 -----    fusemap[FUSE_MAX / (8 * sizeof(header))];
223 -----    infomap[INFO_MAX / (8 * sizeof(header))];
225 -----    epoch;            // word 7 of FWR
227 -----    major;            // keyladder count
229 -----    minor;
231 -----    timestamp;        // time of signing
233 -----    applysec;         // bits to and with fuse BROM APPLYSEC
235 -----    config1;          // bits to mesh with fuse BROM CONFIG1
237 -----    err response;     // bits to or with fuse BROM ERR RESPONSE
239 -----    expect response;  // action to take when expectation is violated
241 -----    pad[...];         // to fill out to 1024 bytes total
243 -----    fuses chk;        // top 32 bits of expected fuses hash
245 -----    info chk;         // top 32 bits of expected info hash
```

FIG. 2

VERIFICATION OF CODE SIGNATURE WITH FLEXIBLE CONSTRAINTS

BACKGROUND

Technical Field

The subject matter described herein generally relates to the field of computing devices and includes security measures administered during startup of a computing device. Security measures may include verification of code signature.

Background Information

In secure computing environments, software or firmware in the form of program code or a sequence of instructions may be verified as being the true unaltered code before being executed in a computing device. Software may be digitally signed, and the digital signature may be verified through a verification process to ensure the software is from a trusted source. Hacking techniques are constantly improving. As such, code verification processes may be vulnerable to non-invasive and physical attacks.

Non-invasive attacks generally involve observing or manipulating a device without causing physical harm to the device. Components of a computing device that may be targets of non-invasive attacks include the CPU, memory, and I/O interfaces. Memory elements may include SRAM, flash, and ROM. Elements processed by a CPU may include instructions, data, and processing results. Security may be compromised by forcing a debug mode, gaining access to additional regions in the device memory, or discovering values of encryption keys.

Fault injection is a form of non-invasive attack. Fault injection generally involves generating malfunctions in the system. A form of fault injection referred to as "glitching" generally involves corrupting data, skipping or altering instructions, or altering the clock signal or the power supply as they are used in performance of a secure process. Altering the clock signal may cause faults such as an incorrect instruction fetch. Invoking a power glitch may result in corrupting a data read from memory.

Computing devices are particularly vulnerable to fault injection attack during manufacturing testing in which device ports, memory, and secret data may be made available to perform the testing. For example, sensitive data such as encryption keys, and code such as firmware may be stored in flash memory. Also, a computing device may be vulnerable to attack during payload installation or installation of application software in a computing device. As such, the code verification algorithm used during installation is particularly vulnerable to glitching.

In addition, hardcoded initial conditions used in a code verification algorithm may make the algorithm more vulnerable to fault injection using a rollback scheme.

Further, memory resources in computing devices may be limited during early testing stages.

As recognized by the inventors, there is a need for a security device and process that permits code and/or commands to be executed only by specified devices and prohibits any other installation and/or execution of the code and/or commands. Such a security device and process should be resistant to glitching and other hacking techniques, including during verification procedures.

As recognized by the inventors, there is a need to permit code to execute if and only if the code is unaltered and the execution environment matches a code signer's specifications. The execution environment may comprise a device state including a chip identifier and states of fuses used to indicate a version number to prevent a rollback attack.

SUMMARY

In general, one aspect of the subject matter described in this specification can be embodied in a computer-implemented method of determining a verification hash of a code image to be executed by a target device, the target device including a memory controller, hardware fuses, and memory, the code image including a header having a code signature and metadata, the computer-implemented method comprising: receiving the header and code image; determining an image hash based on the metadata and code image using a hash function; determining a fuses hash based on values of at least some of the hardware fuses using a hash function; determining an information hash based on at least some of information stored in the memory using a hash function; and determining a verification hash based on the image hash, the fuses hash, and the information hash.

In at least one embodiment, the computer-implemented method further comprises verifying the verification hash against the code signature.

In at least one embodiment, the determining a verification hash based on the image hash, the fuses hash, and the information hash includes applying a hash function to a concatenation of the image hash, the fuses hash, and the information hash.

In at least one embodiment, the determining a fuses hash based on values of at least some of the hardware fuses using a hash includes: generating a fuses array; reading a fuse map comprising a bit vector that identifies predetermined fuses of the hardware fuses; writing values of the predetermined fuses into the fuses array; and determining the fuses hash based on the fuses array using a hash function.

In at least one embodiment, the determining an information hash based on at least some of information stored in the memory using a hash function includes: generating an information array; reading an information map comprising a bit vector that identifies predetermined regions of memory; writing information stored in the predetermined regions of memory into the information array; and determining the information hash based on the information array using a hash function.

In at least one embodiment, the computer-implemented method further comprises: determining a power of the code signature to obtain a padding; determining a logic function of the padding with the verification hash to obtain a constant; determining an unlock constant based on the constant using a hash function; comparing the unlock constant to a predetermined value; and responsive to the unlock constant matching the predetermined value, unlocking a locked region of memory.

In at least one embodiment, the logic function is a same-different logic function.

In at least one embodiment, the computer-implemented method according to claim 1, further comprises: determining an unlock constant based on the verification hash; and responsive to a successful comparison between the unlock constant and a stored predetermined value, unlocking a region in memory of the target device and transferring control to at least one of a memory management unit of the target device, an operating system executed by the target device, or an application executed by an electronic processor included in the target device.

In at least one embodiment, if the verification hash is verified against the code signature, the target device stores the verification hash in a cache and enables a warm restart.

In general, one aspect of the subject matter described in this specification can be embodied in a computer-implemented method for verifying a digital signature comprising performing Montgomery multiplication on a n-bit electronic processor using a modulus having a length of (a×n−b) bits, where a and n are positive integers and b is a positive integer less than 4.

In at least one embodiment, the Montgomery multiplication is performed on a 32-bit electronic processor using a 3071-bit modulus.

In general, one aspect of the subject matter described in this specification can be embodied in a computer-implemented method for digitally signing a message, the message including a fusemap, an infomap, and code to be executed by a target device, the computer-implemented method comprising: generating the message using an electronic processor, wherein the message is based on the fusemap, the infomap, and the code to be executed by the target device; and signing the message using a digital signature algorithm executed by an electronic processor, wherein the target device includes hardware fuses and memory, wherein the fusemap is a bit vector identifying a set of the hardware fuses, and wherein the infomap is a bit vector identifying a region of the memory.

In at least one embodiment, the generating the message using an electronic processor includes applying a hash function to at least one of (a) or (b) as follows: (a) the fusemap, the infomap, and the code to be executed by the target device, or (b) a hash of the fusemap, a hash of the infomap, and a hash of the code to be executed by the target device.

In general, one aspect of the subject matter described in this specification can be embodied in an apparatus that determines a verification hash of a code image to be executed, the code image including a header having a code signature and metadata, the apparatus comprising: at least one processor; hardware fuses; memory; and a non-transitory computer readable medium coupled to the at least one processor having instructions stored thereon that, when executed by the at least one processor, cause the at least one processor to: receive the header and code image; determine, using a hash function, an image hash based on the metadata and code image; determine, using a hash function, a fuses hash based on values of at least some of the hardware fuses; determine, using a hash function, an information hash based on at least some of information stored in the memory; determine a verification hash based on the image hash, the fuses hash, and the information hash; determine an unlock constant based on the verification hash; and responsive to a successful comparison between the unlock constant and a stored predetermined value, unlocking a region in the memory and permitting execution of code in the code image.

In general, one aspect of the subject matter described in this specification can be embodied in an apparatus that digitally signs a message, the message including a fusemap, an infomap, and code to be executed by a target device, the apparatus comprising: at least one processor; and a non-transitory computer readable medium coupled to the at least one processor having instructions stored thereon that, when executed by the at least one processor, cause the at least one processor to: execute an algorithm that generates a message; and execute a digital signature algorithm that signs the message, wherein the target device includes hardware fuses and memory, wherein the fusemap is a bit vector identifying a set of the hardware fuses, wherein the infomap is a bit vector identifying a region of the memory, and wherein the message is based on the fusemap, the infomap, and the code to be executed.

The details of one or more embodiments are set forth in the accompanying drawings which are given by way of illustration only, and the description below. Other features, aspects, and advantages will become apparent from the description, the drawings, and the claims. Like reference numbers and designations in the various drawings indicate like elements.

BRIEF DESCRIPTION OF THE DRAWINGS

FIG. 2 is an example header that may be included at the start of a code image according to one or more embodiments.

The figures depict embodiments of the disclosure for purposes of illustration only. One skilled in the art will recognize from the following discussion that alternative embodiments of the structures and methods illustrated herein may be employed without departing from the principles of the present disclosure.

DETAILED DESCRIPTION

The following description refers to the accompanying drawings. The following description is not intended to limit the scope. Instead, the scope is defined by the appended claims.

Aspects provide solutions to problems related to code signing. Further aspects provide code signing with flexible constraints that enable targeting code and/or commands such that the targeted code may be executed only by specific devices. Code verification may be an embedded solution and may also operate in a resource-constrained environment or otherwise have a small footprint that does not overly impact resources. Such a security process may preferably be resistant to glitching or other attacks during verification procedures.

In an example embodiment, code that is to be executed is verified during bootup of a computing device before control is transferred to a processor. The computing device may be any system that includes a processor and memory having a region dedicated to a boot process. The boot process includes a verification process for verifying code to be executed. Initial code may be contained in boot ROM. Therefore, the initial code may be unalterable. The initial code may be the root of trust and may verify the next stage of code.

Figure 1:
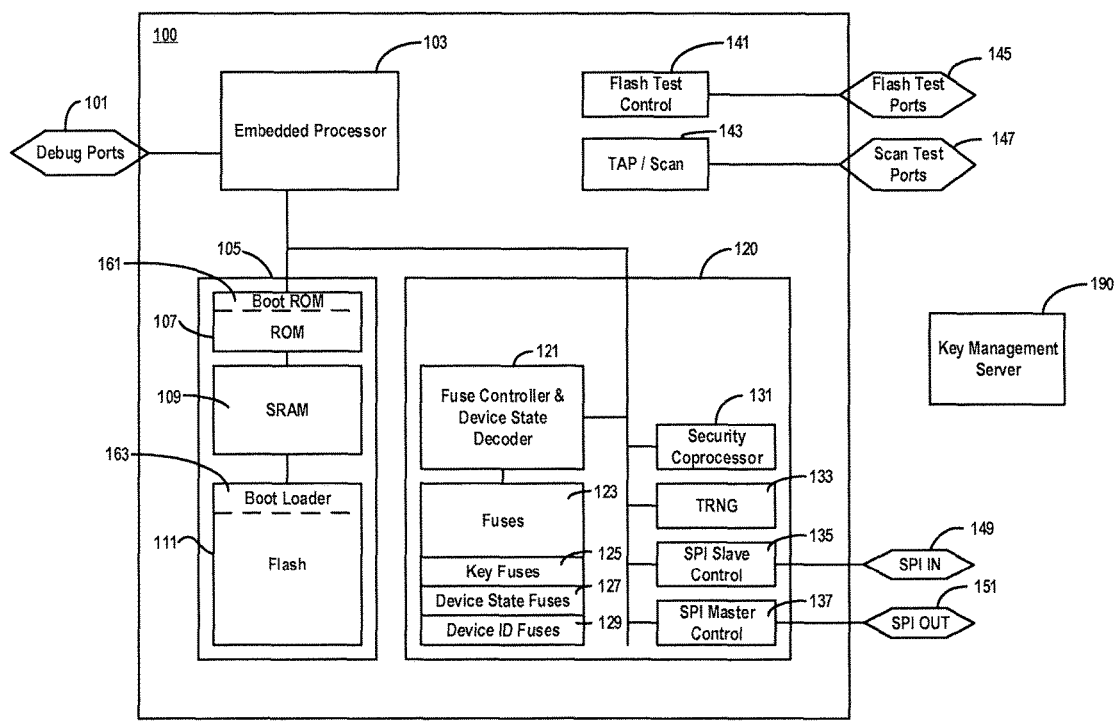
FIG. 1 is a block diagram for an example semiconductor chip device according to one or more embodiments.

An example chip (semiconductor) device 100 is shown in FIG. 1. The chip device 100 includes access ports. The access ports may include debug port(s) 101, one of which may be a serial wire debug (SWD) port which provides a path to fuses 123. Other ports may also be included to provide for access for testing such as flash test port(s) 145 and scan test port(s) 147. The flash test port 145 may have an associated flash test control 141. The scan test port(s) 147 may have an associated test access port (TAP)/scan control 143.

The chip device 100 may be a Serial Peripheral Interface (SPI) slave device in which commands and data may be transmitted using pins SPI IN 149 and SPI OUT 151 having SPI slave control 135 and SPI master control 137, respectively.

In an example embodiment, there may be fuses 123 which serve as bit-storage devices. As a non-limiting example, the fuses 123 may be 27-bit storage devices, but it is understood that the number of bits may vary depending upon the application.

In example embodiments, the fuses 123 may be implemented as a redundant set of fuse registers and fuse macros (see FIG. 1B, described later). Still further, the fuses may be implemented as a set of fuse macros.

In an example embodiment, the fuses 123 may include key fuses 125, device state fuses 127, and device ID fuses 129.

Key fuses 125 may be used to store keys and other secrets. For example, key fuses 125 may store secret data that is a key or used to derive a key that is also stored in the key fuses 125. A specific example is a device initialization key (DIK), which may act as the root shared secret between the chip device 100 and a key management server 190.

The device state fuses 127 store and define the device state. More specifically, device state fuses 127 may include a set or bank of fuses with each set/bank defining an incremental state of the chip device 100 as it undergoes manufacturing testing.

The device ID fuses 129 may store a unique device ID of the chip device 100.

Fuses 123 may have an associated fuse controller and device state decoder 121. In an example embodiment, device states may be derived as a function of a bit pattern stored in the device state fuses 127 using a device state decoder 121. The reading of the device state fuses 127 may be done directly or via fuse shadow registers (shown in FIG. 1B). Further, a comparison operation may also be performed between the device state fuse 127 values and the fuse shadow register value to ensure that that the fuses 127 and/or registers have not been attacked or tampered with. Such comparison operations may also be performed when reading the key fuses 125 and/or device ID fuses 129.

The chip device 100 may include an embedded processor 103 and memory 105 components, including non-volatile memories such as ROM 107 and flash memory 111 as well as a small on-chip RAM such as SRAM 109. Over the course of the chip device 100 lifecycle, a payload including a boot ROM 161 may be written into ROM 107, and a boot loader 163 may be written into flash memory 111.

The chip device 100 may include security processing functions. A security coprocessor 131 may be used to process security algorithms, such as a secure hash algorithm. Example secure hash algorithms include the SHA family of algorithms, preferably SHA-2 or SHA-3. Also, a random number generator, such as a true random number generator (TRNG) 133, may be included to provide random values.

Figure 1B:
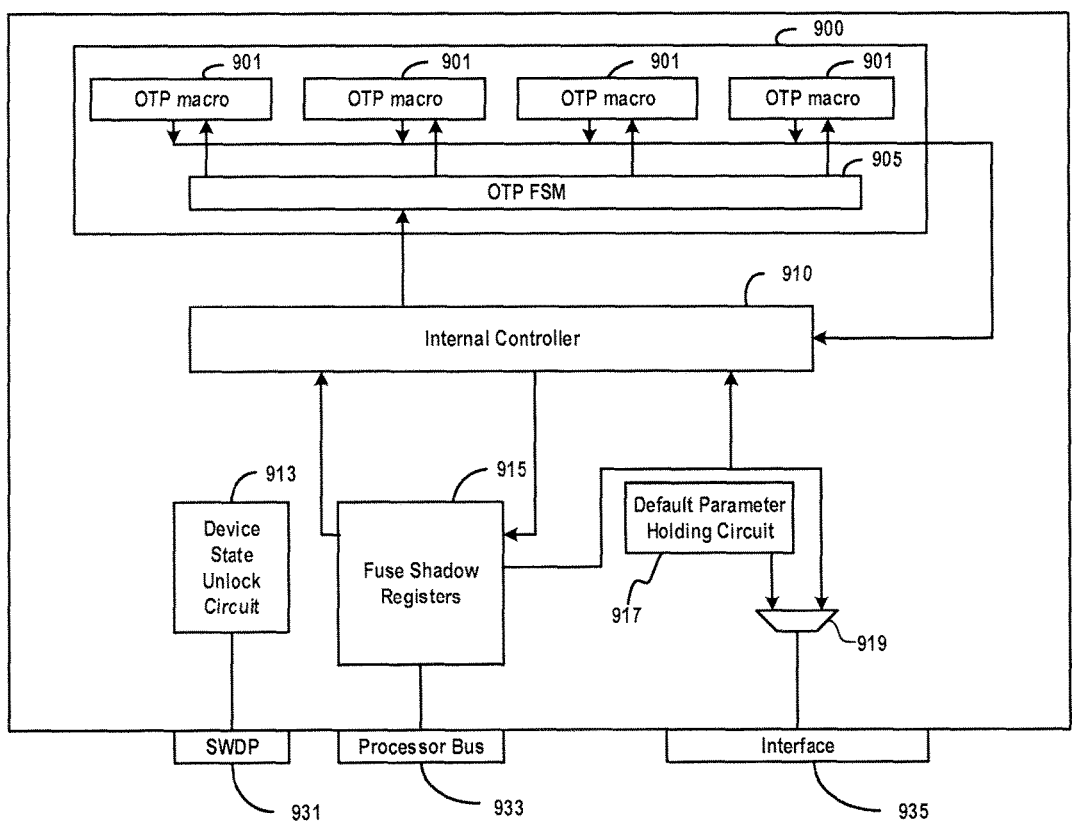
FIG. 1B is a block diagram for an example device state decoder according to one or more embodiments.

FIG. 1B is a block diagram of an example embodiment of the fuse controller 121 that handles programming of a set of associated fuse macros 900. In this example embodiment, fuse shadow registers 915 may redundantly store bit values of fuse macros. The redundant storage of fuse bits may be arranged in a manner that provides an extra layer of protection for control of any test mode or security sensitive features. The redundant storage of bit values of fuse macros may also incorporate mechanisms to protect from attacks on shadow operation. For example, an attack on fuse macro latch operation may be detected as the attack could cause all the fuse shadow registers 915 to become zero, even when the fuse macros 900 themselves are not zeros.

In the example fuse controller 121, fuse bits may be programed by way of fuse shadow registers 915, in which the actual fuse macros are blown internally by the fuse controller. Functions associated with programming actual fuses 900 and reading fuse values may be handled by an internal controller 910. Also, the fuse controller 121 may include a finite state machine 905 to handle programming of particular fuse macros 900. Programming of fuse macros 900 may be enabled based on a command transmitted through a serial wire debug port (SWDP) 931 to a device state unlock circuit 913. The device state unlock circuit 913 enables a device state stored in the fuse macros to be incremented to a next device state. A mechanism for setting the device state to default may be provided by default parameter holding circuit 917 and logic gate 919, which control access to the fuses via an interface 935. A processor bus 933 provides a path for reading or programming fuse values stored in fuse shadow registers 915.

Header

In an example embodiment, a payload to be installed in the chip device 100 may include a header 200. The header may include a signature and other metadata. The signature is for verifying the payload to ensure that it is from a trusted source.

An example header 200 that may be included at the start of a code image of the payload is shown in FIG. 2. In an example embodiment, the header may be a 1024-byte header. The header 200 may include a signature 201 that may be the result of a digital signature over a hash function that had previously been applied to the code or command set. The signature 201 may be provided by the provider of the code or command set. In an example embodiment, boot ROM 161 or boot loader 163 may use the signature 201 to verify that the code or command set has not been altered and is not from an untrusted source. Further, in an example embodiment, boot ROM 161 or boot loader 163 may use the signature 201 to verify that the code image pertains to the specific chip device 100. More specifically as further explained below, aspects include binding a code block (code image) to a specific device, per fuse and information state.

The signature 201 may have an embedded factor that saves computational work and reduces the amount of code required to perform signature verification. The reduction in computational overhead and amount of code may result from the embedded factor's elimination of modular reduction steps otherwise required when processing multiple precision modular arithmetic on an electronic processor having a data pipeline bounded by a bit width. In example embodiment, the signature 201 may be provided in a Montgomery form, and Montgomery multiplication may be used when verifying the signature 201. In an example embodiment, a factor R may be multiplied into the signature 201 before the signature 201 is incorporated into the header 200. In an example embodiment implemented on a n-bit processor, the factor R may be $2^{kn}$, where k is a positive integer. In an example embodiment, the factor R may be $2^{3072}$. In an example embodiment implemented on a n-bit processor, the modulus may have a length of (a×n−b) bits, where a and n are positive integers and b is a positive integer less than 4. In an example embodiment implemented on a 32-bit processor, the modulus may have a length of 3071 bits. A modulus having a length of (a×n−b) bits may reduce or eliminate Montgomery reduction steps, thereby improving the function of an electronic computer for the reasons discussed herein.

The header 200 may also include an optional public key 209. In an example embodiment, the public key 209 may be included in an application header 200 and used by a boot loader 163 to verify and initialize a keyladder with a hash of the public key 209, tag 205, and epoch 225 to provide unique and secure keyladders. In an example embodiment, the secure keyladders may provide an approach to self-sign applications that can be transferred into and out of the chip device 100, while retaining their own private key material.

An example embodiment includes device state fuses 127 for storing a state of the chip device 100 as shown in FIG. 1. Device state fuses 127 are typically set during chip production. Embodiments include registers in non-volatile memory that may be used as storage during execution of code or commands. In an example embodiment, the registers may include read-only regions in ROM 107 and may include executable regions in flash memory 111.

An aspect is a resilient computation or measurement of the current state of the chip device 100. The measured state may be resiliently computed using a code signature that includes three components. The three components may include image(s) of the code or commands to be executed on the target chip device (100), fuses (123, 125, 127, and/or 129), and information (malleable device state of the target chip device 100 (via non-volatile memory, e.g. flash 111, or volatile memory such as RAM, e.g. SRAM 109)).

The image component may include the header 200, metadata other than the signature 201, and an expected image hash value (img check 203). The image component (img) includes one or more images of the code or command set to be executed by the chip device 100.

The fuses component (fuses) may correspond to the device state fuses 127 of the chip device 100. The device state fuses component may indicate the device state of the chip device 100. In an example embodiment, there may be 128 fuses of varying bit width. Fuse values may be set during manufacture of the chip device 100.

The information component (info) may indicate the state of memory or, in other words, the malleable device state of the target chip device 100. In an example embodiment, the information component may indicate the malleable device state using four sets of 128 words in a write-once region of flash memory 111.

In an example embodiment, the info component may be used for version rollback protection. Versions of code can include version 0, version 1, etc. Rollback protection may prevent earlier versions of code from being executed. For example, a signature for version 0 may indicate that all 128 words should be erased. The signature for version 1 may indicate that all but the first word should be erased, such that once version 1 of the code writes to the first word, version 0 may never be validated again.

Aspects include code or command set verification that runs on a target chip device 100, which by use of a set of constraints target a specific device 100. Aspects provide a way for the code signer to bind code to a specific device, based on the state of fuses (fuses component) and information (info component).

In an example embodiment, the set of constraints include a fusemap 221 and an infomap 223, which are provided in header 200. The fusemap 221 may be a bit vector that identifies which fuses hold values a code signer would like verify to allow execution of the code signer's code. The infomap 223 may be a bit vector that identifies which words in the write-once region would be of interest to the code signer. By implementing code verification constraints based on code signer selected values, the verification process can be made robust without exposing security sensitive control flow to glitch-based attacks.

The header 200 may include an img check 203, a fuses check 243, and an info check 245. The header 200 may also include padding to fill out remaining bytes (pad 241).

Verification Hash

In an example embodiment, a boot ROM 161 and a boot loader 163 may perform verification for executable code or command set before transferring control to a processor or application. Verification of the executable code or command set involves verification of the signature 201 that is included in the header 200.

In an example embodiment, verification of the signature 201 may involve measuring or determining the hash for each of the three components. The signature 201 is associated with the image(s), which may be images for the code that is to be executed in the chip device or commands in a command set to be performed in the chip device.

Figure 3:
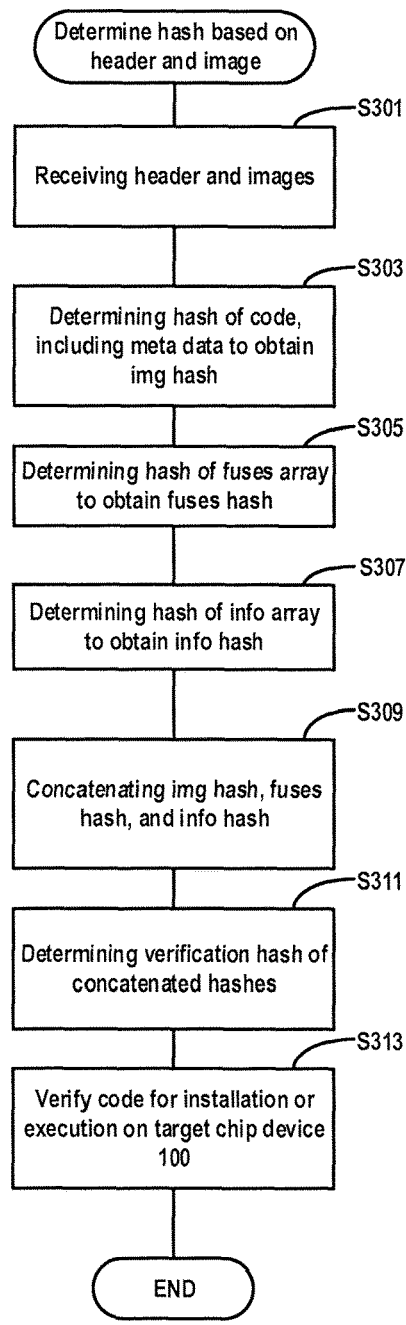
FIG. 3 is a flow diagram for a method for determining a hash of a header and image according to one or more embodiments.

In an example embodiment, boot ROM firmware 161 may include a process, as illustrated in FIG. 3, for verifying code to be executed by a target chip device 100 using a combination of an image hash, a fuses hash, and an information hash. FIG. 3 is a flow diagram for an example process that may start by determining a hash based on the header 200 and associated image(s) of the code to be verified and executed by the target chip device 100. In an example embodiment, the process for determining a hash is performed using a particular version of the boot ROM 161.

In step S301, the image(s) including a header 200 are received in the chip device 100. In step S303, the boot ROM 161 for the chip device 100 determines a hash, using a hash function such as SHA-256, for the image(s), which includes part of the header (starting with tag 205 in FIG. 2) and the image bits of the target code. The result is an image hash (img hash).

The chip device 100 may have a number of distinct device state fuses 127 which may be used to indicate various physical states of the chip device. The device state fuses 127 may have different bit lengths. In an example embodiment, the chip device 100 has 128 fuses (device state fuses 127) some or all of which may be selected as specified in a fusemap 221 and used in a verification process. A code signer may select specific fuses. A code signer may select arbitrary fuses. Alternatively, a code signer may select via fusemap 221 particular fuses 127 of interest, or that may be necessary for execution of the targeted code. The selection of specific fuses may be represented in a bit vector stored in fusemap 221, which is provided in the header 200.

In step S305, the boot ROM in the chip device 100 determines a hash based on the values of the fuses 123, 125, 127, and/or 129, the location or identity of which are specified by the fusemap 221.

Figures 4, 5:
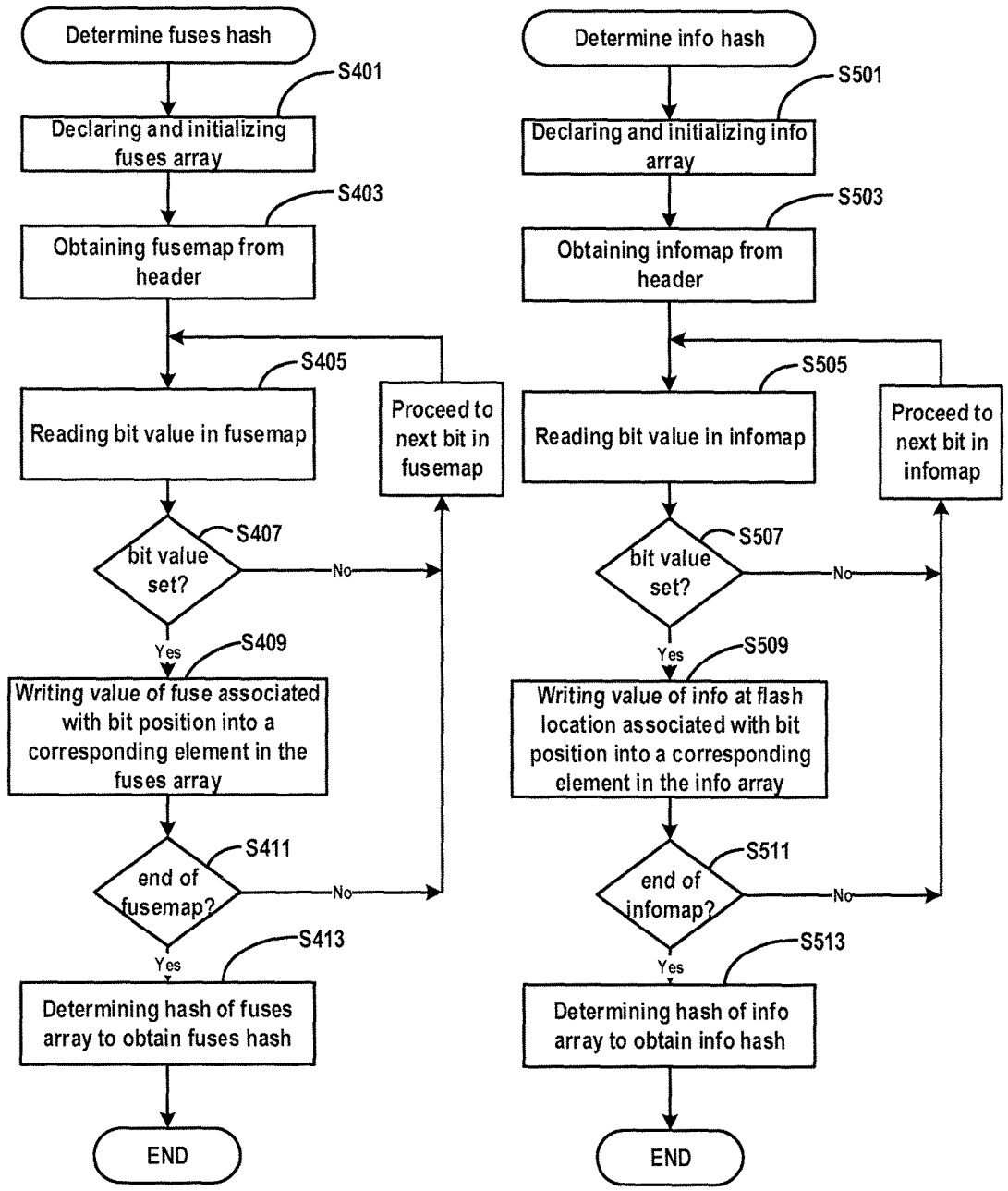
FIG. 4 is a flow diagram for a method for determining a hash of fuse values according to one or more embodiments.
FIG. 5 is a flow diagram for a method for determining a hash of information values according to one or more embodiments.

FIG. 4 is a flow diagram for an example process of determining the hash for the fuse values of step S305. In step S401, a fuses array may be declared, and the fuses array may be initialized by setting each element in the fuses array to a specified default value. In step S403, the fusemap 221 may be obtained from header 200. The fusemap 221 is a bit vector indicating which fuses are of interest to the code signer.

In an example embodiment, the process loops through each bit in the fusemap 221 and changes the default value in select elements of the fuses array to match the value of a fuse associated with the bit in the fusemap 221. The loop begins in step S405, by reading a bit value in the fusemap 221. If the bit is set (for example, has been set to a value 1) (YES in step S407), the value of a fuse associated with the bit position is written (step S409) into a corresponding element in the fuses array. If a bit value in the fusemap 221 has not been set (NO in step S407), the loop moves to the next bit in the fusemap 221. The loop continues through each bit to write values of select fuses into the fuses array until in step S411 the end of the fusemap 221 has been reached (YES in step S411).

In step S413, the boot ROM 161 in the chip device 100 determines a hash, using a hash function such as SHA-256, for the fuses array. The result is a fuses hash.

In a similar manner, in step S307, the boot ROM in the chip device 100 determines a hash of information in a memory, such as flash 111, to obtain an info hash. The chip device 100 loops through bits in the infomap 223 and for each set bit, the corresponding entry in the info array is replaced with the value read from the write-once flash 111 location. In an example embodiment, the chip device may have 4 sets of 128 words in the write-once region of flash 111. In an example embodiment, the boot ROM 161 references the values in the first set, and the boot loader 163 references the values in the second set.

FIG. 5 is a flow diagram for an example process of determining the info hash of step S307. In step S501, an info array may be declared, and the info array may be initialized by setting each element in the array to a specified default value. In step S503, the infomap 223 may be obtained from header 200. The infomap 223 is a bit vector indicating which memory (e.g. flash 111) locations are of interest to the code signer.

In an example embodiment, the process loops through each bit in the infomap 223 and builds an info array. The loop begins in step S505, by reading a bit value in the infomap 223. If the bit is set (for example, has been set to a value 1) (YES in step S507), the value of a flash location associated with the bit position is written (step S509) into a corresponding element in the info array. If a bit value in the infomap 223 has not been set (NO in Step S507), the loop moves to the next bit in the infomap 223. The loop continues through each bit to write values of select memory (e.g. flash 111) locations into the info array until in step S511 the end of the infomap 223 has been reached (YES in step S511).

In step S513, the boot ROM 161 in the chip device 100 determines a hash, using a hash function such as SHA-256, for the info array. The result is an information hash (info hash).

Returning to the higher level flowchart of FIG. 3, component hash values (e.g. the image hash (img hash), the fuses hash, and/or the information hash (info hash)) may be used in determining a hash for verification of the header signature 201. In an example embodiment, the boot ROM concatenates (step S309) the img hash, fuses hash, and info hash, and then, in step S311, determines a verification hash, which is a hash of the concatenated hashes.

Finally, in step S313, a verification process may be performed by checking the verification hash obtained in S311 against the signature 201 in the header 200.

By measuring a hash for fuses and information in which specific fuses and information, such as flash region(s), are specified by the code signer, the code signer is able to bind a code block to a specific device, according to the device's fuse and information state. For example, a device ID fuse 129 on the chip device 100 may encode a value of 12345. If the code signer wants to target a device ID having a value of 12345, a bit in the fusemap 221 corresponding to the device ID fuse 129 will be set. At code block signing time, the value 12345 for the device ID is hashed in by the code signer, and the output of this hash is signed using a secure digital signature scheme, e.g. FIPS 186-4 Digital Signature Standard.

By allowing the code signer to select fuses and flash regions, the hash determining process of FIG. 3 enables robust verification of the code. The code signer does not need to know the details of a special security sensitive control flow. These features allow for resilient protection against various types of glitching and fault injection attacks in the signature verification flow.

Assume an attacker can cause code execution to skip instructions. Further, assume the attacker can cause load and store operations to yield all zeros or all ones but is unable to load or store large bit vectors of particular patterns. Under this attack model, an attacker may cause a glitch or a skip while processing the header 200 or while sampling the fuses or info (malleable device state) as described herein. However, it is computationally infeasible for the attacker to produce a bit vector that matches the verification hash.

In addition to providing a code signer with a capability of selecting specific fuses and flash memory regions, aspects include a hardware unlock mechanism as a further defense against glitching attacks on the code verification flow as well as in the process of transferring control to the embedded processor 103. In example embodiments, a chip device 100 may boot using a limited executable region in the ROM 107. The boot ROM 161 may then open extra regions in memory for code execution. To open extra regions in memory, reference is made to values for a range in a read-only memory region of ro base 213, ro max 215, and to values for a range in an executable memory region of rx base 217 and rx max 219, which are fields in the header 200. In an example embodiment, setting up executable regions for the embedded processor 103 to perform as a memory management unit (MMU) may require writing the base and max values to staging registers. In an example embodiment, the chip device 100 may have several executable regions, each with rwx (read write execute) attributes.

In an example embodiment, in order to activate the staging registers and permit execution of a code block, one or more hardware comparators compare an unlock constant against a predetermined value. In an example embodiment, the code block may not be executed unless all of the one or more hardware comparators agree that the unlock constant equals the predetermined value. This hardware unlock mechanism protects against glitching of the code verification process and glitches during execution of a conditional statement in code.

Figure 6:
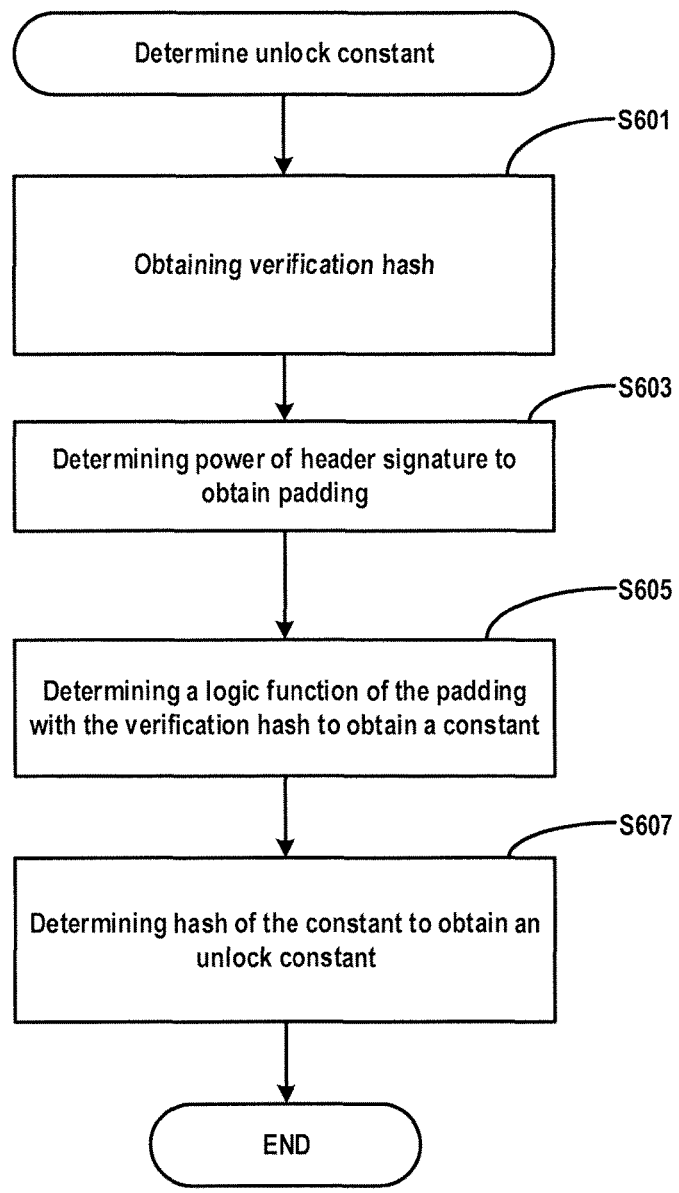
FIG. 6 is a flow diagram for a method for determining an unlock constant according to one or more embodiments.

FIG. 6 is a flow diagram of an example process for calculating an unlock constant. In an example embodiment, the unlock constant is determined as part of the code verification process and for activating extra regions of memory as part of control transfer. In step S601, the verification hash is obtained by determining a hash of the concatenation of the img hash, fuses hash, and info hash (result of the process shown in FIG. 3). In step S603, a power of the verification hash may be used to obtain a value for padding. In an example embodiment, the power is the cube of the signature 201. In an example embodiment, the padding may be PKCS #1 version 1.5 padding. In step S605, a logic function of the padding with the verification hash is determined to obtain a constant. The resulting constant may include the padding, ASN.1 bits, and zeros in the hash field. In step S607, a hash of this constant is determined to obtain the unlock constant.

The logic function of step S605 may be XOR, but the embodiments are not limited thereto. For example, the padding may be XORed with the verification hash to obtain the constant. In another example, the padding may be XNORed with the verification hash to obtain the constant. More generally, a function is applied to the padding and the verification hash, and it is preferable the function be side-channel free. Note that XOR (and XNOR) can be implemented in hardware and determined quickly, and XOR (and XNOR) does not involve a carry bit. As used herein, a "same-different logic function" is a logic function that, when given a first bit vector and a second bit vector as input, provides as output a bit vector wherein each ith bit indicates whether the ith bit of the first bit vector is the same as, or different from, the ith bit of the second bit vector. Therefore, XOR and XNOR are both examples of same-different logic functions.

The process of determining an unlock constant may be used by the boot ROM 161 in the process of transferring control to the embedded processor 103. The process of determining an unlock constant may be used by the boot loader 163 in a process of transferring control to an application.

Figure 7:
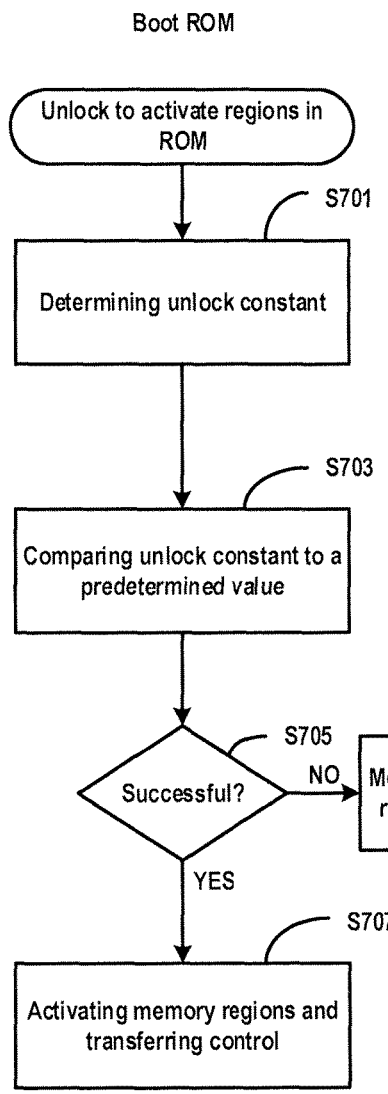
FIG. 7 is a flow diagram for boot ROM to unlock regions in a ROM according to one or more embodiments.

FIG. 7 is a flow diagram for an exemplary unlock process performed by the boot ROM 161. Step S701 is the process of determining the unlock constant of FIG. 6. In step S703, the unlock constant is written to a hardware comparator and compared to a predetermined value, which may be a stored constant. If the comparison is successful (YES, step S705), in step S707, values are latched to staging registers and the region defined by the values in the staging registers may be used to transfer control to the embedded processor 103.

Figure 8:
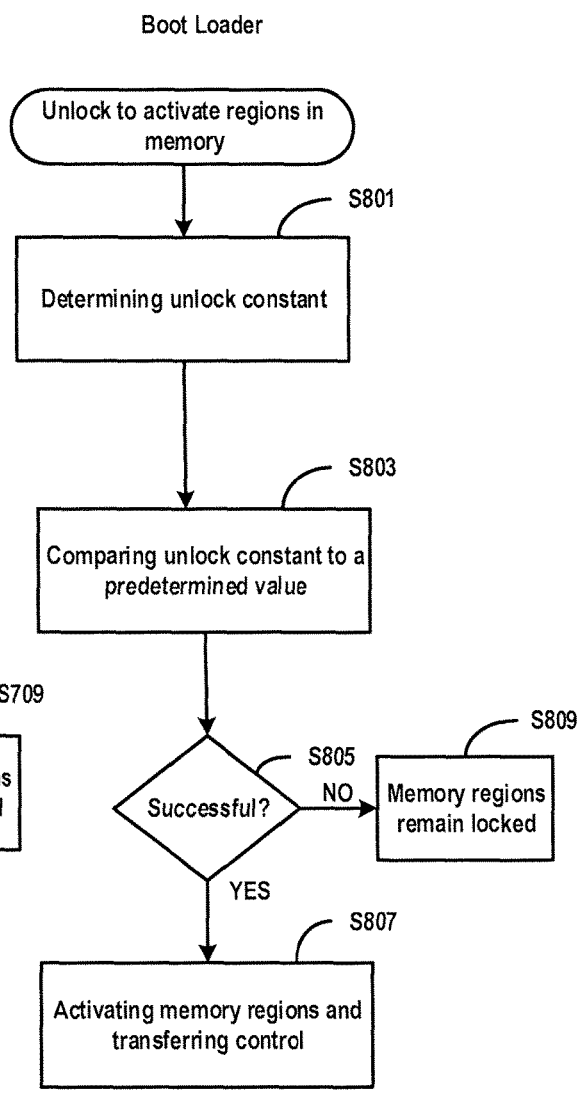
FIG. 8 is a flow diagram for boot loader to unlock regions in a ROM according to one or more embodiments.

FIG. 8 is a flow diagram for an exemplary unlock process performed by the boot loader 163. The process is similar to the process performed by the boot ROM 161, except that in the case of the boot loader 163, the process is for transferring control to an operating system or application. Step S801 is the process of determining the unlock constant of FIG. 6, the verification hash based on code to be executed in a next execution level. In step S803, the unlock constant is written to a hardware comparator and compared to a predetermined value, which may be a stored constant. If the comparison is successful (YES, step S805), in step S807, values are latched to staging registers and the region defined by the values in the staging registers is activated and control is transferred to an operating system or an application.

Warm Restart Optimization

Figure 9:
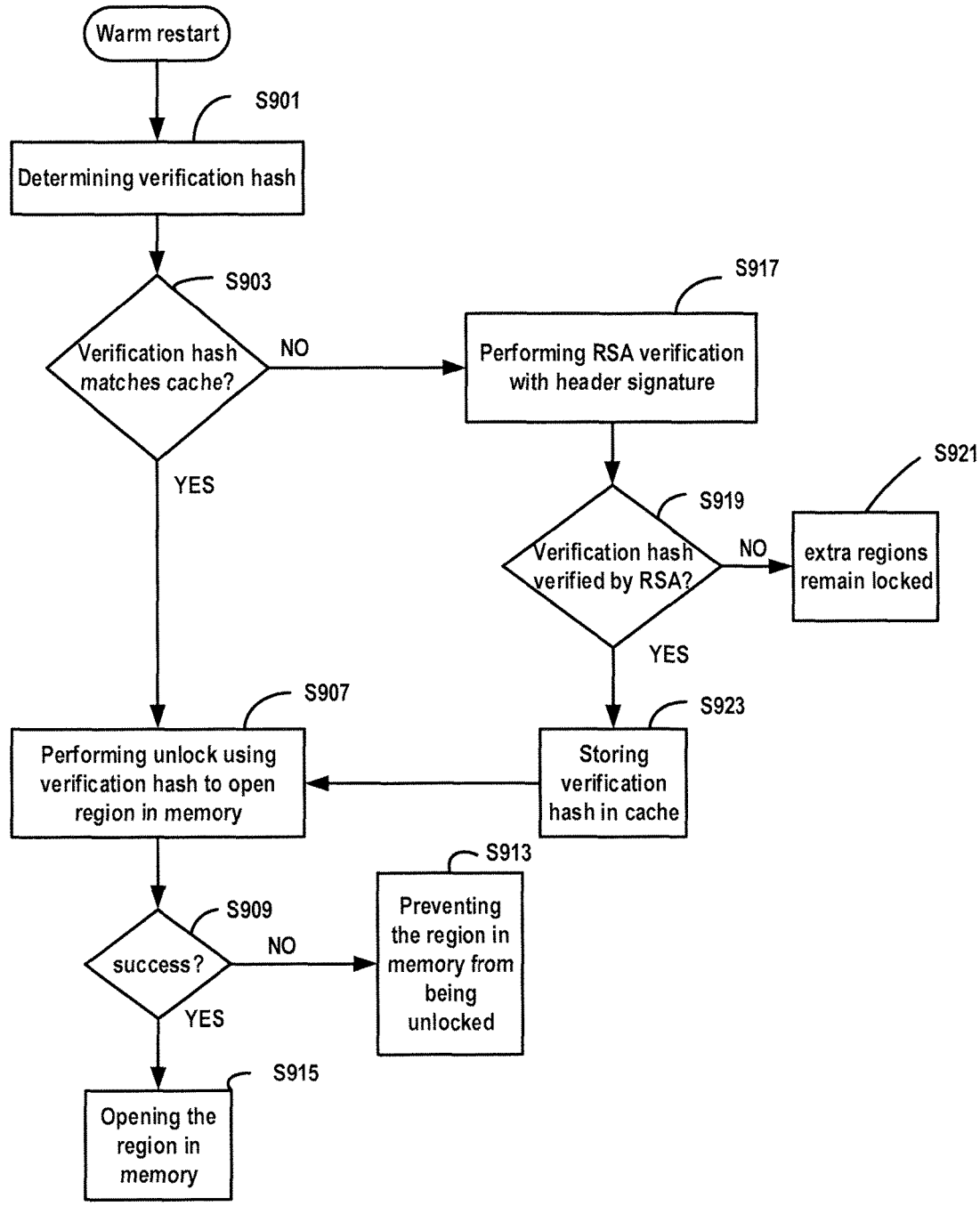
FIG. 9 is a flow diagram for warm restart of the chip device according to one or more embodiments.

In some circumstances, it may not be necessary to repeat the determination of the verification hash each time the chip device 100 is restarted. In an example embodiment, a faster restart may be accomplished by caching a previously determined verification hash so that a warm restart may be performed in subsequent restarts. FIG. 9 is a flow diagram for an example warm restart process. Upon any restart, in step S901, the boot ROM 161 may perform a process to determine the verification hash (FIG. 3). In step S903, the boot ROM 161 may check whether the verification hash matches a previous verification hash stored in a cache. In an example embodiment, the cache may be special registers that retain their values during low-power suspend modes of the chip device 100.

If the verification hash does not match a verification hash stored in cache (NO, step S903), in step S917, the boot ROM 161 performs full signature verification using, for example, RSA verification. In step S919, the boot ROM 161 checks whether the verification hash has been verified in the RSA signature verification process. If the boot ROM 161 is unable to verify the verification hash (NO in step S919), in step S921, the extra regions in memory are prevented from being unlocked for execution.

If the boot ROM 161 is able to verify the verification hash (YES in step S919), in step S923, the verified verification hash may be stored in cache for future warm restart processing. In step S907, the boot ROM 161 may attempt to perform an unlock process using the verified verification hash to open a region in memory for execution.

Alternatively, in the case that the verification hash matches a previously verified hash stored in the cache (YES in step S903), the boot ROM 161, in step S907, may attempt to perform an unlock process to open a region in memory for execution (FIG. 7) using the verification hash determined in step S901.

If the unlock process is successful (YES, step S909), in step S915 the region in memory is opened for execution.

A failure of the unlock process (NO, step S909) will cause the boot ROM 161, in step S913, to be prevented from unlocking the region in memory for execution.

A warm restart process of FIG. 9 may also be performed by the boot loader 163. In the case of warm restart by the boot loader 163, the security coprocessor 131 may be available for performing the hashing process. In an example embodiment, processing of a secure hash algorithm such as SHA-256 may be performed by the security coprocessor 131.

In an example embodiment, the chip device 100 may include a hardware keyladder mechanism. The embedded processor 103 may manipulate the keyladder mechanism. The embedded processor 103 may not observe the inputs of the keyladder and may obtain only sanctioned outputs. Both boot ROM 161 and boot loader 163 may have to load and lock various inputs to the keyladder scheme as part of their roles in the chip device 100.

Figure 10:
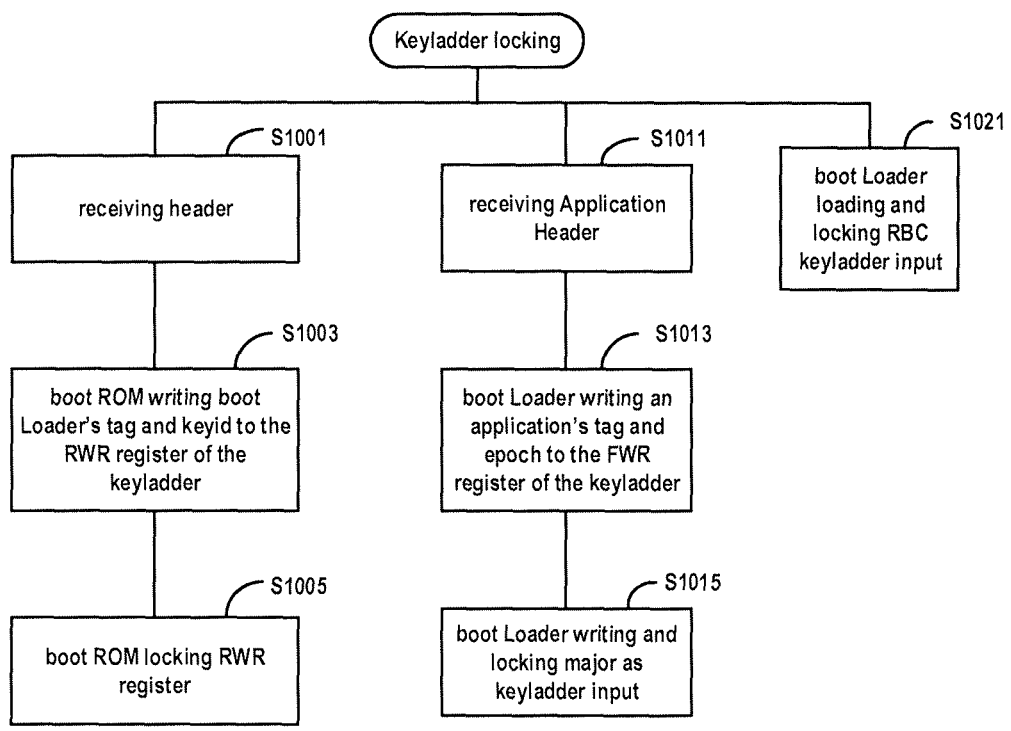
FIG. 10 is a flow diagram for a method of locking keyladder hardware according to one or more embodiments.

FIG. 10 is a flow diagram for a process of locking the keyladder according to one or more embodiments. Upon receiving a header (step S1001), in step S1003, the boot ROM may write a boot loader's header tag 205 and header keyid 207 to a RWR register of the keyladder. In step S1005, the RWR register is locked such that the value held in the register can be seen but not altered by subsequent code. No further keyladder processing is performed by the boot ROM 161.

Upon receiving an application header (step S1011), in step S1013, the boot loader 163 may write an application's header tag 205 and header epoch 225 to a FWR register of the keyladder. In step S1015, the boot loader may write and lock the application's header major as input to the keyladder.

Additionally, in step S1021, the boot loader 163 may load and lock a RBC keyladder input. In an example embodiment, the input value may be the SHA-256 of the entire boot ROM code. Step S1021 may be performed by the boot loader 163 in order to accommodate for risk of initial silicon failures during manufacturing. In an example embodiment, step S1021 may instead be performed in boot ROM 161.

Henceforth the application can obtain various derived values from the keyladder, but the application is constrained by the major 227 and may not change the locked RWR, FWR, or RBC inputs.

Digital Signature

Figure 11:
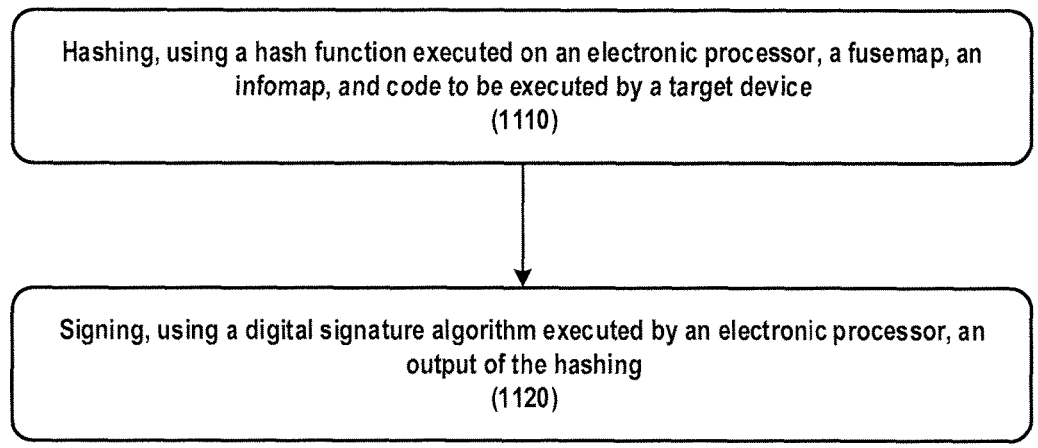
FIG. 11 is a flow diagram for a method of digitally signing a message comprising code and constraints according to one or more embodiments.

FIG. 11 is a flow diagram for a method of digitally signing a message comprising code and constraints according one or more embodiments. The constraints may include, without limitation, a state of memory of a target device, a device ID of the target device, a value of a rollback counter of the target device, and/or values of a set of fuses of the target device. First, using a hash function executed on an electronic processor, a fusemap, an infomap, and code to be executed by a target device are hashed (step S1110). Second, using a digital signature algorithm executed by an electronic processor, an output of the hash function is signed (step S1120). The digital signature algorithm may be included in a Digital Signature Standard of the National Institute of Standards and Technology or in FIPS publication number 186-4. The target device may include hardware fuses and memory. The fusemap may be a bit vector identifying a set of the hardware fuses of the target device, and the infomap may be a bit vector identifying a region of the memory of the target device. The fusemap and infomap included in the message digitally signed by the method set forth in FIG. 11 may be the fusemap 221 and infomap 223, respectively, as described herein. The message may also include portions of the header 200.

Figure 12:
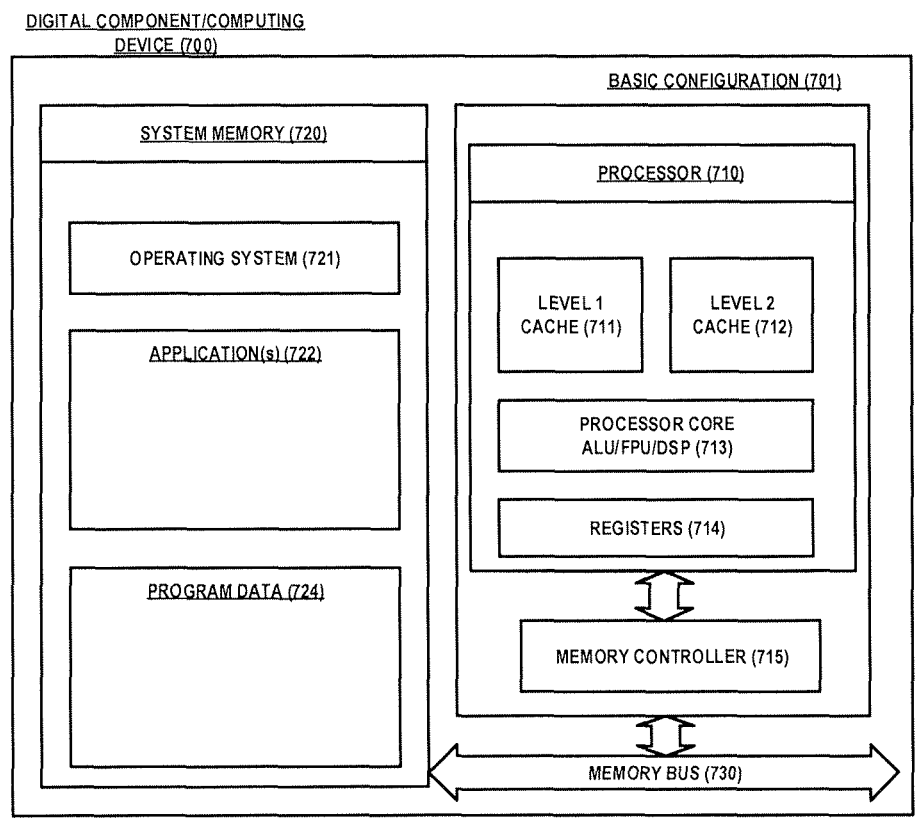
FIG. 12 is a block diagram illustrating an example computing device that implements the digital components according to one or more embodiments.

FIG. 12 is a high-level block diagram of an exemplary device (700) according to one or more embodiments described herein. The device 700 may for example be an embedded system in a resource-constrained environment. Depending on application, the device 700 may have restraints including size, power, cost, and execution latency. The device 700 may for example be a microcontroller, such as a security microcontroller providing security, encryption, and cryptography protocols to a connected computer or communication device digitally signing code, verifying digitally signed code, executing digitally signed code, or performing Montgomery modular arithmetic, or a computer or communication device including embedded security. In accordance with at least one embodiment, digital component/computing device (700) may be configured to perform various functions including determining a hash function, determining a digital signature, and checking values of hardware fuses. In accordance with at least one embodiment, digital component/computing device (700) may include a keyladder, the fuse controller and device state decoder 121, fuses 123, key fuses 125, device state fuses 127, device ID fuses 129, security coprocessor 131, true random number generator 133, SPI slave control 135, and/or SPI master control 137. In accordance with at least one embodiment, digital component/computing device (700) may implement a key management server 190.

In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more application(s) (722), and program data (724). The application(s) (722) may include software implementations of a pseudorandom number generator, hash function(s), digital signature algorithm(s), and/or cryptographic function(s) in accordance with one or more embodiments described herein. Program Data (724) may include storing instructions that, when executed by the one or more processing devices, implement a pseudorandom number generator, hash function(s), digital signature algorithm(s), and/or cryptographic function(s) in accordance with one or more embodiments described herein. In some embodiments, the application(s) (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) may be implemented in an integrated circuit such as a microcontroller or a system on a chip (SoC), or it may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (700) may also be implemented as a personal computer including both laptop computer and non-laptop computer configurations, one or more servers, Internet of Things systems, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In accordance with at least one embodiment, several portions of the subject matter described herein may be implemented via one or more ASICs, Field Programmable Gate Arrays (FPGAs), digital signal processors (DSPs), or other integrated formats. However, those skilled in the art will recognize that some aspects of the embodiments disclosed herein, in whole or in part, can be equivalently implemented in one or more integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that several portions of the mechanisms of the subject matter described herein are capable of being distributed as a program product in a variety of forms, and that an illustrative embodiment of the subject matter described herein applies regardless of the particular type of non-transitory computer-readable medium used. Examples of a non-transitory computer-readable medium include, but are not limited to, the following: a recordable type medium such as a flash drive, a hard disk drive, a solid state drive, a Compact Disc (CD), a Digital Video Disk (DVD), a digital tape, and a computer memory, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The systems, apparatuses, and methods discussed herein do not require collection or usage of user personal information. In situations in which certain implementations may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems, apparatuses, and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method of determining a verification hash of a code image to be executed by a target device, the target device including a memory controller, hardware fuses, and memory, the code image including a header having a code signature and metadata, the computer-implemented method comprising:
   receiving the header and code image;
   determining an image hash based on the metadata and code image using a first hash function;
   determining a fuses hash based on values of at least some of the hardware fuses using a second hash function;
   determining an information hash based on at least some of information stored in the memory using a third hash function;
   determining a verification hash based on the image hash, the fuses hash, and the information hash;
   verifying the verification hash against a code signature; and
   responsive to the verification hash being verified against the code signature, storing the verification hash in a cache to enable a warm restart.

2. The computer-implemented method according to claim 1, wherein the determining a verification hash based on the image hash, the fuses hash, and the information hash includes applying a fourth hash function to a concatenation of the image hash, the fuses hash, and the information hash.

3. The computer-implemented method according to claim 1, wherein the determining a fuses hash based on values of at least some of the hardware fuses using a hash includes:
   generating a fuses array;
   reading a fuse map comprising a bit vector that identifies predetermined fuses of the hardware fuses;
   writing values of the predetermined fuses into the fuses array; and
   determining the fuses hash based on the fuses array using the second hash function.

4. The computer-implemented method according to claim 1, wherein the determining an information hash based on at least some of information stored in the memory using third hash function includes:
   generating an information array;
   reading an information map comprising a bit vector that identifies predetermined regions of memory;
   writing information stored in the predetermined regions of memory into the information array; and
   determining the information hash based on the information array using third hash function.

5. The computer-implemented method according to claim 1, wherein the header contains a public key that is useable to verify and initialize a keyladder.

6. The computer-implemented method according to claim 1, wherein the code image is associated to a chip device.

7. The computer-implemented method according to claim 1, wherein the code image includes an expected image hash value.

8. An apparatus that determines a verification hash of a code image to be executed, the code image including a header having a code signature and metadata, the apparatus comprising:
 at least one processor;
 hardware fuses;
 memory; and
 a non-transitory computer readable medium coupled to the at least one processor having instructions stored thereon that, when executed by the at least one processor, cause the at least one processor to:
 receive the header and code image;
 determine, using a first hash function, an image hash based on the metadata and code image;
 determine, using a second hash function, a fuses hash based on values of at least some of the hardware fuses;
 determine, using a third hash function, an information hash based on at least some of information stored in the memory;
 determine a verification hash based on the image hash, the fuses hash, and the information hash by applying a fourth hash function to a concatenation of the image hash, the fuses hash, and the information hash;
 determine an unlock constant based on the verification hash; and
 responsive to a successful comparison between the unlock constant and a stored predetermined value, unlocking a region in the memory and transferring control to at least one of a memory management unit of the target device, an operating system executed by the target device, or an application executed by an electronic processor included in the target device.

9. The apparatus according to claim 8, wherein the hardware fuses are of varying bit width.

10. The apparatus according to claim 9, wherein the hardware fuses include key fuses that store keys.

11. The apparatus according to claim 9, wherein the hardware fuses include state fuses that store device states.

12. The apparatus according to claim 9, wherein the hardware fuses include device identification fuses that store a unique device identifier.

13. The apparatus according to claim 9, wherein the apparatus is an integrated circuit that is a system on chip.

14. A non-transitory computer-readable storage medium comprising instructions that, when executed by at least one processor of a computing device, cause the at least one processor to determine a verification hash of a code image to be executed by a target device, the target device including a memory controller, hardware fused, and memory, the code image including a header having a code signature and metadata, the instructions, when executed, cause the at least one processor to determine the verification hash of the code image by:
 receiving the header and code image;
 determining an image hash based on the metadata and code image using a first hash function;
 determining a fuses hash based on values of at least some of the hardware fuses using a second hash function;
 determining an information hash based on at least some of the information stored in the memory using a third hash function;
 determining a verification hash based on the image hash, the fuses hash, and the information hash;
 verifying the verification hash against a code signature; and
 responsive to the verification hash being verified against the code signature, storing the verification hash in a cache to enable a warm restart.

15. The non-transitory computer-readable storage medium according to claim 14, wherein the instructions, when executed by the at least one processor, cause the at least one processor to receive the header and code image by receiving a public key that is useable to verify a keyladder.

16. The non-transitory computer-readable storage medium according to claim 15, wherein they keyladder is a secure keyladder for a self-sign application.

17. The non-transitory computer-readable storage medium according to claim 14, wherein the instructions, when executed by the at least one processor, cause the at least one processor to:
 determine an unlock constant based on the constant using a fourth hash function;
 compare the unlock constant to a predetermined value by writing the unlock constant to a hardware comparator; and
 responsive to the unlock constant matching the predetermined value, unlocking a locked region of the memory.

18. The non-transitory computer-readable storage medium according to claim 17, wherein the predetermined value is a stored constant.

19. The non-transitory computer-readable storage medium according to claim 17, wherein the instructions, when executed by the at least one processor, cause the at least one processor to open the region of the memory for execution of the code image by unlocking the locked region of the memory.

* * * * *